May 6, 1958  V. D. POLHEMUS  2,833,552
DYNAMIC VIBRATION DAMPER
Filed Sept. 26, 1955  3 Sheets-Sheet 1
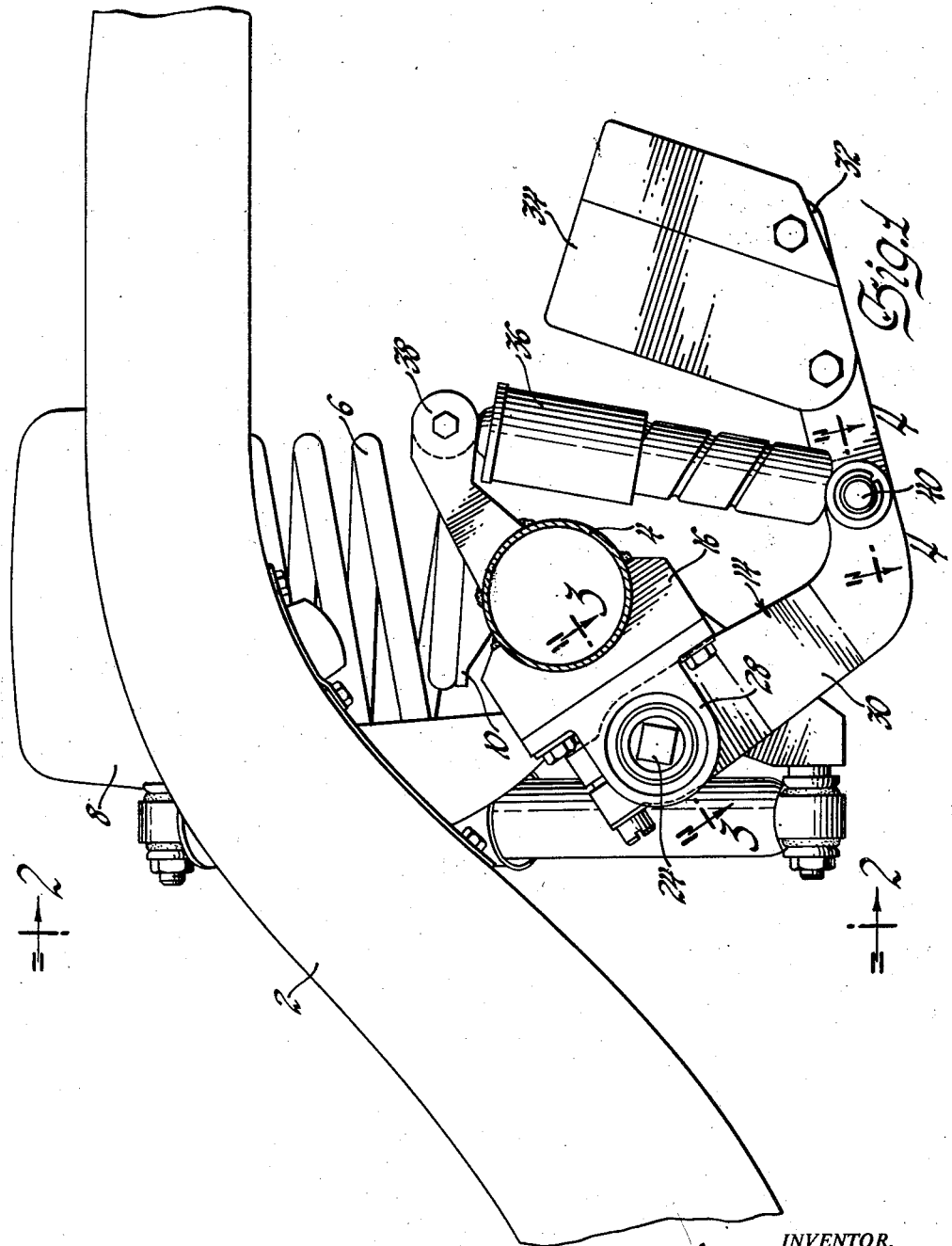
INVENTOR.
Von D. Polhemus
BY
Paul Fitzpatrick
ATTORNEY May 6, 1958 V. D. POLHEMUS 2,833,552
DYNAMIC VIBRATION DAMPER
Filed Sept. 26, 1955 3 Sheets-Sheet 2
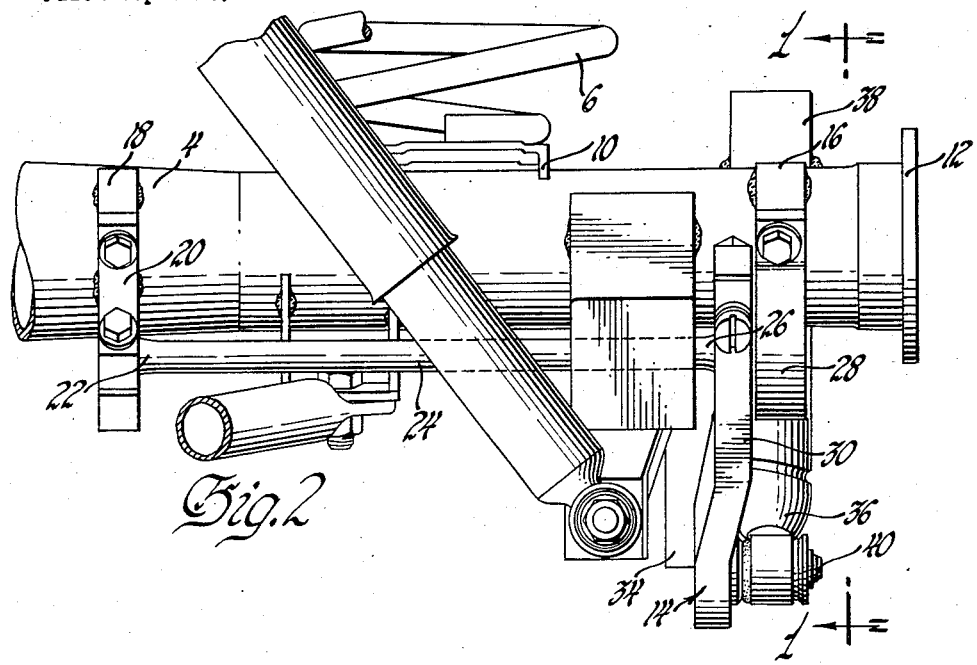
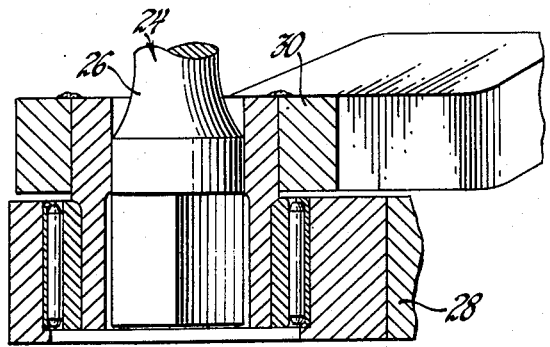
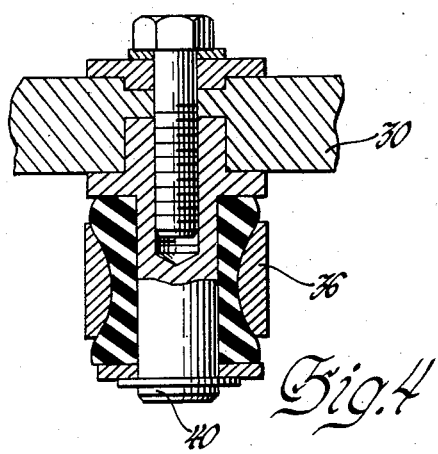
INVENTOR.
Von D. Polhemus
BY
Paul Fitzpatrick
ATTORNEY

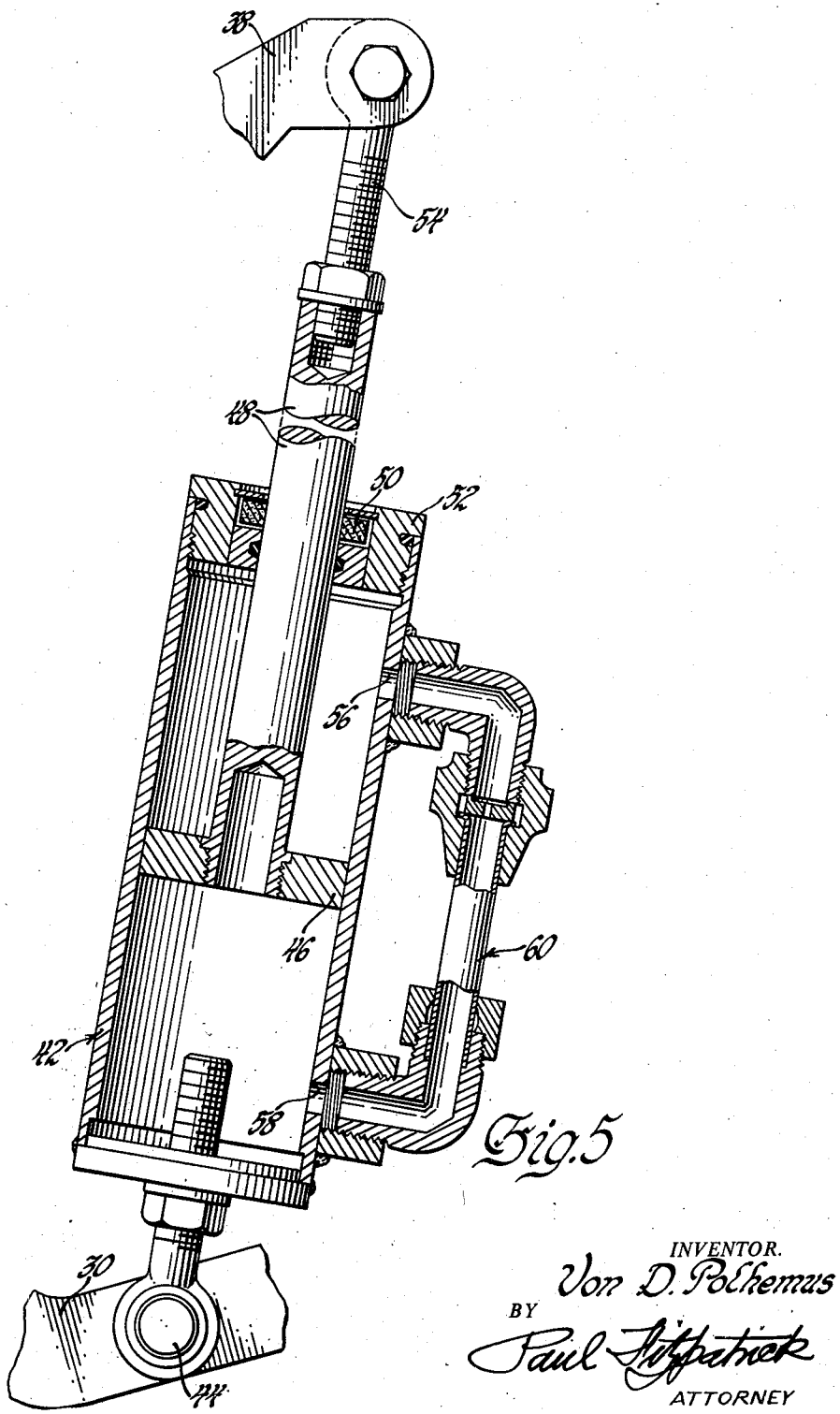

2,833,552
DYNAMIC VIBRATION DAMPER

Von D. Polhemus, Franklin, Mich., assignor to General Motors Corporation, Detroit, Mich., a corporation of Delaware Application September 26, 1955, Serial No. 536,431

11 Claims. (Cl. 280—124)

This invention relates to dynamic vibration dampers and more particularly, although not exclusively, to damper constructions for use in conjunction with vehicle rear wheel suspensions.

Various forms of dynamic vibration dampers have been proposed in the past, wherein a suitably shaped mass is slidably confined in a casing and yieldably maintained centrally therein by means of springs which are tuned to cause oscillation of the mass at the same frequency but out of phase with the oscillation of the element to which the casing is secured. While such dampers have been found to perform efficiently, certain disadvantages and difficulties arise in connection with installation of a damper of this type on conventional rear wheel suspensions. By conventional rear wheel suspension, reference is made primarily to an arrangement wherein the rear wheels are rotatably mounted at opposite ends of a one-piece rear axle housing so that the unsprung mass at the rear includes both of the rear wheels and the entire rear axle assembly. Because of the appreciably higher unsprung mass present in this form of rear suspension, it has been found that cylinder type wheel hop dampers of the type previously described must be excessively large in order to efficiently dampen wheel hop and axle tramp. Since little vertical space is available, increase in diameter of the cylinder is required in order to offset the reduction in length. Because of the large diametral dimensional requirements of such dampers, it may be difficult, if not impossible, to provide sufficient clearance therefor in the limited space available between the vehicle rear axle and the vehicle frame and underbody.

An object of the present invention is to provide a dynamic vibration damper which is particularly suitable for use in connection with rear suspension wherein the unsprung mass includes the rear axle structure.

Another object is to provide a dynamic vibration damper wherein the major elements thereof are readily accessible in the installed position.

A further object is to provide an open-type vibration damper utilizing torsion means to control the frequency thereof.

Still a further object is to provide a dynamic vibration damper which is adapted for mounting on the rear axle of a vehicle and which is formed and arranged to require minimum lateral clearance.

Still another object is to provide a lever-type dynamic damper.

Yet another object is to provide a lever-type dynamic damper having readily detachable damping means.

Still a further object is to provide a lever-type damper utilizing a conventional telescoping shock absorber as damping means.

These and other objects, advantages and features of the invention will become more readily apparent as reference is had to the accompanying specification and drawings wherein:

Fig. 1 is a fragmentary side elevational view of a portion of a rear vehicle suspension, illustrating the form and arrangement of the invention with reference thereto.

Fig. 2 is a fragmentary front elevational view looking in the direction of arrows 2—2 of Fig. 1.

Fig. 3 is an enlarged fragmentary view, partly in section, looking in the direction of arrows 3—3 of Fig. 1.

Fig. 4 is an enlarged fragmentary view in section looking in the direction of arrows 4—4 of Fig. 1; and Fig. 5 is an enlarged sectional elevational view of a modified form of damper element for the mechanism.

Referring now to the drawings and particularly Figs. 1 and 2, there is illustrated the left rear portion of a coil spring rear suspension, in which the reference character 2 designates generally the left longitudinally extending side frame member. Since the particular form of the suspension forms no part of the invention, a detailed description thereof will be omitted. For a complete description of a suspension structure of the type illustrated, reference may be had to U. S. 2,159,203 C. A. Chayne, entitled Vehicle Rear Suspension, assigned to General Motors Corporation. Disposed beneath side frame member 2 and extending transversely of the vehicle is a conventional tubular axle housing 4 which is provided midway thereof with a differential housing, not shown. It will be understood that the structure associated with the right rear side of the vehicle is identical with that of the left rear side, and accordingly, the description of one side will be equally applicable to the other. Disposed between frame member 2 and axle housing 4 is a coil spring 6. At its upper end, spring 6 is seated in an upwardly deformed pocket 8 associated with frame 2, and at its lower end, spring 6 engages a spring seat 10 secured to the upper surface of axle housing 4. At its lateral extremity, axle housing 4 is provided with a flange 12. It will be understood that the left vehicle wheel, not shown, is rotatably mounted adjacent flange 12 in the conventional manner.

In order to control "axle tramp" resulting from high frequency oscillation of the axle and wheels associated therewith, in accordance with the present invention, there is provided a lever type dynamic vibration damper 14 which is mounted for pivotal movement in a vertical plane parallel with and laterally inwardly adjacent axle flange 12. As seen in Fig. 1, a forwardly and downwardly facing mounting bracket 16 is secured, as by welding, to the periphery of axle housing 4. A similar supporting bracket 18 is secured to housing 4 in laterally inwardly spaced relation from bracket 16. Secured to bracket 18 is a forwardly extending anchor structure 20 which is adapted to clampingly engage the inner end 22 of a transversely extending torsion rod 24. At its outer end 26, rod 24 is rotatably supported in a bearing structure 28 which, in turn, is connected to bracket 16. Immediately laterally inwardly adjacent structure 28, torsion bar 24 has connected thereto a generally L-shaped lever 30 which extends downwardly and rearwardly below axle housing 4. At its rearward extremity 32, lever 30 has bolted thereto a relatively heavy mass 34. Mass 34 is narrow in a transverse section in order to provide maximum clearance with the side walls of the vehicle wheel housing, not shown. It will be understood that the specific weight of mass 34 may vary considerably depending upon such factors as the total weight of the unsprung mass of the rear suspension and the length of lever 30. Similarly, the spring rate of torsion bar 24 will vary in accordance with the suspension characteristics of the vehicle, a rate being selected which will cause mass 34 to oscillate at a frequency similar to axle tramp frequency but out of phase therewith. In order to increase the tolerance of the mechanism to a wide range of vibration amplitude in the embodiment shown in Fig. 1, a conventional telescoping shock absorber 36 is connected between a rearwardly extending bracket 38 on housing 4 and a selected intermediate point 40 on lever structure 30.

In operation, when vehicle operating conditions excite high frequency vertical oscillation or axle tramp, mass 34 and lever 30 are caused to oscillate about the axis of torsion bar 24 at the same frequency as the axle tramp frequency and, therefore, tend to cancel or counteract the forces tending to excite axle tramp. When road conditions are encountered which induce excessive wheel hop amplitude, telescoping shock absorber 36 functions as a dashpot to restrict the maximum amplitude of oscillation of mass 34 and lever 30 to predetermined limit.

In Fig. 5, there is illustrated a modified dashpot structure for limiting amplitude of vibration of the mechanism. In the modified form, a cylinder 42 is pivotally connected at 44 to an intermediate point on lever 30. A piston 46 is slidably disposed in cylinder 42 and has attached thereto a tubular piston rod 48 which extends outwardly through a seal structure 50 formed in the upper closed end 52 of cylinder 42. At its upper end, piston rod 48 is provided with a threadably adjustable connector portion 54 which, in turn, is pivotally connected to bracket 38 on axle housing 4. At vertically spaced points, the wall of cylinder 42 is provided with apertures 56 and 58 which are interconnected by means of an external pipe structure 60. In operation, when piston 46 moves upwardly or downwardly in cylinder 42, air confined at one side of piston 46 is compressed while a corresponding reduction of pressure occurs at the opposite side thereof. Therefore, when the piston moves upwardly, for example, compressed air passes out of the upper end of cylinder 42 through orifice 56 and re-enters the lower end of the cylinder through orifice 58. A reversal of the direction of piston 46, of course, causes reverse flow of air. Therefore, to provide the desired damping of amplitude of oscillation of lever 30 and mass 34, it is only necessary to suitably calibrate the diameters of orifices 56 and 58. In the event of extremely violent oscillation amplitude, piston 46 will approach one or the other of end walls of cylinder 42 sufficiently close to close aperture 56 or 58, as the case may be. Under such conditions, the remaining air trapped between the piston and cylinder end wall will be unable to escape and will, therefore, rapidly snub the swinging movement of lever 30 and mass 34, while preventing piston 46 from bottoming at either end of the cylinder.

From the foregoing it will be seen that a novel and greatly simplified dynamic damper structure has been devised. The structure not only overcomes space limitations which present great difficulties in connection with closed type dampers, but, in addition, is extremely rugged in construction and requires a minimum of accurately machined components. Further, the structure is more readily susceptible to field service, adjustments and repair than previous known types of damper structures.

While but two embodiments of the invention have been shown and described, it will be apparent that other changes and modifications may be made therein. It is, therefore, to be understood that it is not intended to limit the invention to the embodiments shown, but only by the scope of the claims which follow.

I claim:

1. In a vehicle including a wheel and axle, a dynamic vibration damper comprising an oscillatable lever connected at one end to said axle, a weight attached at the other end of said lever, a spring connected between said axle and said lever for controlling the frequency of oscillation of the latter, and a dashpot connected between said lever and said axle for controlling the amplitude of oscillation of said lever.

2. In a vehicle including an unsprung wheel and axle, a dynamic vibration damper comprising an oscillatable lever connected at one end to said axle, a weight attached at the other end of said lever, a spring connected between said axle and said lever for controlling the frequency of oscillation of the latter, and a dashpot connected between said lever and said axle for controlling the amplitude of oscillation of said lever.

3. In a vehicle including an unsprung wheel and axle, a support on said axle, a dynamic vibration damper comprising an oscillatable lever pivotally connected at one end to said support, a weight attached at the other end of said lever, a spring engaging said lever for controlling the frequency of oscillation of said lever, and a dashpot connected at one end intermediately on said lever and at the other end to said support for controlling the amplitude of oscillation of said lever.

4. In a vehicle including an unsprung wheel and axle, a dynamic vibration damper comprising an oscillatable lever pivotally connected at one end to said axle, a weight attached at the other end of said lever, a torsion spring connected between said axle and said lever for controlling the frequency of oscillation of the latter, and a dashpot connected between said lever and said axle for controlling the amplitude of oscillation of said lever.

5. In a vehicle including an unsprung wheel and axle, a dynamic vibration damper comprising an oscillatable lever pivotally connected at one end to said axle, a weight attached at the other end of said lever, a torsion spring anchored at one end on said axle, the other end engaging said lever for controlling the frequency of oscillation of said lever, and a dashpot connected between said lever and said axle for controlling the amplitude of oscillation of said lever.

6. In a vehicle including an unsprung wheel and axle, a support connected to said axle, a dynamic vibration damper comprising a vertically oscillatable lever pivotally connected at one end to said support, a weight attached at the other end of said lever, a torsion spring anchored at one end on said axle, the other end of said spring engaging said lever for controlling the frequency of oscillation of the latter, and a telescoping shock absorber connected between said lever and said support for controlling the amplitude of oscillation of said lever.

7. In a vehicle including an unsprung axle having road wheels mounted thereon, a dynamic vibration damper comprising a vertically oscillatable lever pivotally connected at one end to said axle, a weight attached at the other end of said lever, a transversely extending torsion spring anchored at one end on said axle, the other end of said spring engaging said lever for controlling the frequency of oscillation of the latter, and a telescoping shock absorber connected between said lever and said axle for controlling the amplitude of oscillation of said lever.

8. In a vehicle including an unsprung axle housing having driving wheels rotatably mounted thereon, a pair of dynamic vibration dampers, each comprising a vertically oscillatable lever pivotally connected at one end to said axle housing and extending downwardly and rearwardly therefrom, a weight attached at the other end of said lever, a torsion spring extending parallel to said axle housing and having one end anchored thereto, the other end of said spring engaging said lever for controlling the frequency of oscillation of said lever, and a telescoping shock absorber connected between said lever and said axle housing for controlling the amplitude of oscillation of said lever.

9. In a vehicle including an unsprung axle housing having driving wheels mounted thereon, a pair of dynamic vibration dampers, each comprising a vertically oscillatable lever pivotally connected at one end to said axle housing and extending downwardly and rearwardly therefrom, a weight attached at the other end of said lever, a torsion spring extending parallel to said axle housing and anchored at one end thereto, the other end of said spring engaging said lever for controlling the frequency of oscillation of the latter, said other end being rotatably supported on said axle adjacent said lever so that the axis of oscillation of said lever is co-axial with the axis of said spring, and a telescoping shock absorber connected between said lever and said axle housing for controlling the amplitude of oscillation of said lever.

10. The structure set forth in claim 5 wherein said dashpot includes compression snubbing means operative upon movement of said dashpot beyond predetermined limits.

11. The structure defined in claim 1 wherein said dashpot comprises a closed casing, a piston movable in said casing, means forming openings at each end of said casing, a calibrated external conduit means connecting said openings to provide communication between the opposite ends of said casing whereby fluid compressed in one end of said casing by movement of said piston is discharged into the opposite end of said casing at a predetermined rate, each of said openings being spaced inwardly from the respective ends of said casing so that said piston is effective to close said openings upon close approach to either end of said casing thereby trapping the remaining fluid and snubbing the action of said dashpot at its limits of movement.

References Cited in the file of this patent

UNITED STATES PATENTS

| | | |
|---|---|---|
| 164,202 | Paris | June 8, 1875 |
| 989,958 | Frahm | Apr. 18, 1911 |
| 1,531,938 | Hilden | Mar. 31, 1925 |
| 2,199,084 | Schieferstein | Apr. 30, 1940 |

FOREIGN PATENTS

| | | |
|---|---|---|
| 363,039 | Great Britain | Dec. 17, 1931 |
| 433,532 | Great Britain | Aug. 9, 1935 |
| 651,502 | Germany | Oct. 14, 1937 |